United States Patent [19]

Morgan et al.

[11] 4,104,352
[45] Aug. 1, 1978

[54] METHOD OF MAKING A BOWLING PIN

[75] Inventors: Wesley W. Morgan, San Antonio; Frank E. Davis, Arlington, both of Tex.

[73] Assignee: Columbia Industries, Inc., San Antonio, Tex.

[21] Appl. No.: 782,901

[22] Filed: Mar. 30, 1977

Related U.S. Application Data

[62] Division of Ser. No. 425,327, Dec. 17, 1973, abandoned.

[51] Int. Cl.² .......................... B29C 5/00; B29D 9/00; B29G 1/00
[52] U.S. Cl. .................................. 264/250; 264/248; 264/255; 264/294; 264/320; 264/347

[58] Field of Search ............... 264/250, 255, 120, 347, 264/320, 323, 331, 325, 294, 296, 112, 119, 123, 113, 266, 248; 273/82 R

[56] References Cited

U.S. PATENT DOCUMENTS 4,012,386   3/1977   Davis ........................... 273/82

Primary Examiner—Willard E. Hoag
Attorney, Agent, or Firm—John C. Stahl

[57] ABSTRACT

Method of making a hollow bowling pin comprising a base, body and cap wherein at least said body is composed of a thermoset composition, and said base and cap are composed of a thermoset or thermoplastic composition. The body of said pin may be composed of two or more sections of different hardness.

8 Claims, 9 Drawing Figures

20 # METHOD OF MAKING A BOWLING PIN

BACKGROUND OF THE INVENTION

The American Bowling Congress (ABC) has established rigid specifications for standard wood pins, plastic coated (wood core), and nonwood (synthetic) pins. Since sound, hard maple, heretofore required for wood pins, is in short supply, attention has recently been directed to synthetic pins. Prior to approval for use in ABC sanctioned leagues and tournament play, synthetic pins must pass rigid testing; the material of which said pin is composed, the measurements, center of gravity, radius of gyration, finish, durability and scorability are considered. Additionally, to be acceptable to bowlers, a synthetic pin must produce a sound similar to that produced by a conventional maple pin.

Synthetic bowling pins made of acrylonitrile-butadiene-styrene (ABS), copolylactam and polycaprolactum have heretofore been suggested in the prior art.

SUMMARY OF THE INVENTION

The contoured, hollow bowling pin of the preferred embodiment comprises a base, body consisting of belly, neck and head, and cap wherein said base and cap are inserted and fixedly secured in said body; at least said body is composed of a thermoset composition, and said base and cap are composed of a thermoset or thermoplastic composition. Alternatively, the body of said pin may comprise two or more sections corresponding to different, selected hardness.

Another embodiment of bowling pin comprises two or more polyester premix compositions to vary the specific gravity and/or hardness of selected sections thereof.

A base attachment may also be molded in the basal portion of said bowling pins of thermoset or themoplastic composition.

The bowling pins thus formed are uniform in construction and extremely consistent in their action in excess of 5,000 lines. Furthermore, fewer steps are required in the manufacture, as compared to conventional wood pins, with a substantially smaller investment in equipment.

DESCRIPTION OF PREFERRED EMBODIMENTS

Figure 1:
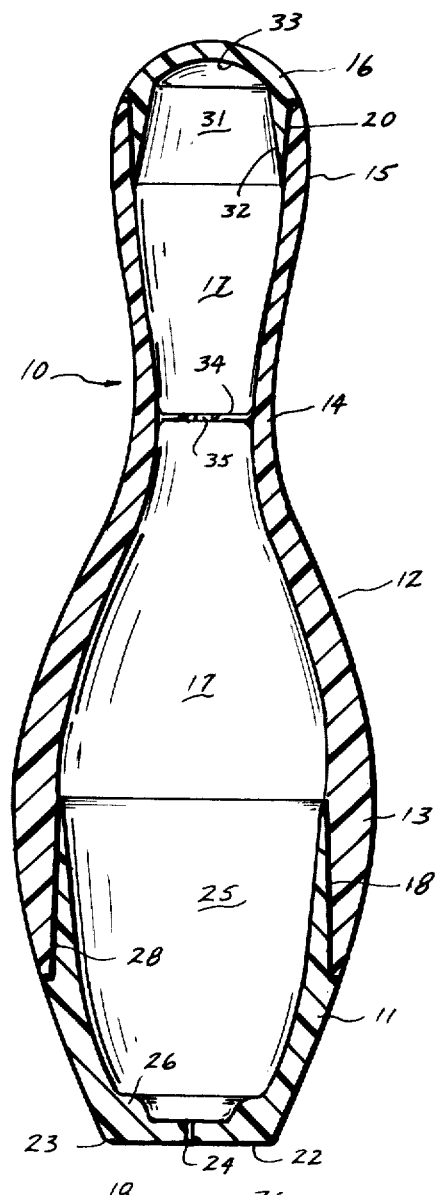
FIG. 1 is a vertical sectional view through the preferred embodiment of hollow bowling pin of the subject invention.
Figure 2:
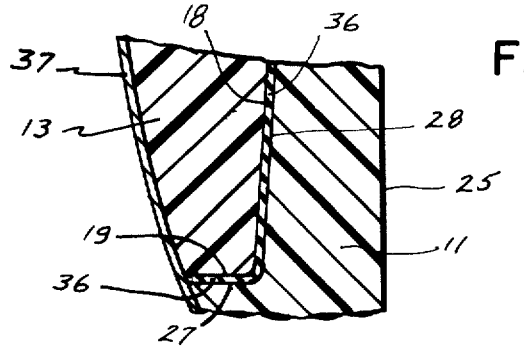
FIG. 2 is a fragmentary, greatly enlarged, vertical sectional view through the joint between the base and body of the bowling pin of FIG. 1.

Referring now to the drawings, wherein like reference characters designate like or corresponding parts throughout the several views, there is shown in FIG. 1 a preferred embodiment of bowling pin 10 constructed in accordance with the principles of the invention; pin 10 is a hollow, elongated body contoured in accordance with American Bowling Congress (ABC) specifications to define base 11, body 12 comprising belly 13, neck 14 and head 15, and cap 16, respectively. Interiorly, body 12 is provided with a longitudinal cavity 17 which generally conforms in shape to the corresponding exterior portions of belly 13, neck 14 and head 15; said cavity includes diverging conical section 18 which terminates downwardly in edge 19 (see FIG. 2) and diverging conical section 20 which terminates upwardly in rim 21 (see FIG. 3).

Base 11 of generally cup-like configuration terminates downwardly in bottom 22 the edges of which are preferably radiused, indicated by reference numeral 23. Center hole 24 passes through bottom 22 and communicates with an essentially conical cavity 25 in said base. Desirably a ring 26 is integrally formed in the interior angle between the lower side walls and bottom 22, respectively. Exteriorly, base 11 includes shoulder 27 (see FIG. 2) in proximity to the midpoint thereof with upwardly extending, converging conical portion 28 adapted to insert into section 18.

Figure 3:
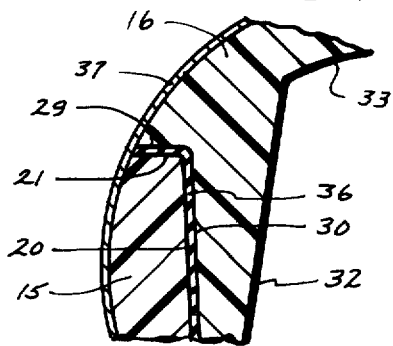
FIG. 3 is a fragmentary, greatly enlarged, vertical sectional view through the joint between the cap and body of the bowling pin of FIG. 1.

As best seen in FIG. 3, cap 16 is provided with shoulder 29 and downwardly depending, converging conical portion 30 adapted to insert into section 20. A downwardly opening cavity 31, bounded by converging conical section 32 and rounded apex 33, is desirably provided in cap 16.

Figure 4:
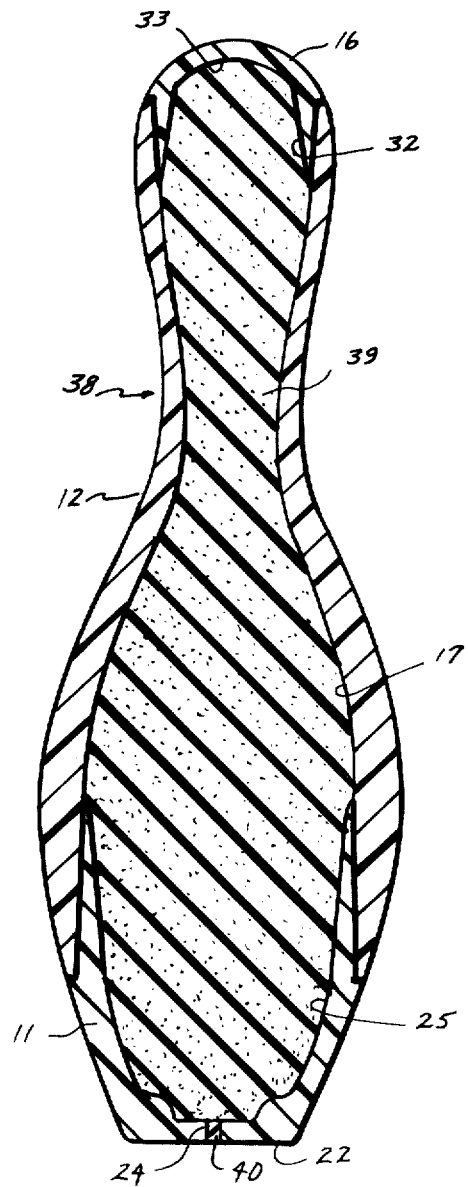
FIG. 4 is a vertical sectional view through a modification of the embodiment of FIG. 1.

During the molding process, hereinafter to be described, the ends of the opposing rams or mandrels utilized to form cavity 17 in body 12 normally butt whereby the said cavity extends completely therethrough, as illustrated in FIG. 4 of the drawings. It is understood that the depth of penetration of either one or both rams may be regulated whereby a transverse web 34 ranging in thickness from 1/16 inch -¼ inch is formed in neck 14 intermediate said rams thereby increasing the strength of such portion. In such modification, a vertically extending bore 35 is conventionally provided in web 34.

Conical section 20 in the upper end of body 12 and portion 30 of cap 16 are roughened, as by grinding or sand blasting, to remove the surface release agent hereinafter to be described; a high strength adhesive 36 is then applied to at least one of said members as by brushing, spraying or other conventional method, and such members mated; the adhesive normally extrudes between rim 21 and shoulder 29. In like manner, conical section 18 in the lower end of body 12 and portion 28 of base 11 are roughened, adhesive 36 applied to at least one or said members, and portion 28 inserted in section 18; adhesive extrudes between edge 19 and shoulder 27. Any adhesive on the outside of the pin at the joints thus formed is removed. Adhesive 36, which may range in thickness from .005 inch-.020 inch, is preferably an epoxy cement comprising a reaction product of bisphenol-A and epichlorohydrin, with or without diluents, and a curing agent comprising polymeric amine, modified organic salt of cyclic amine, or modified cyclic amine; a ratio of 100 parts by weight of a reaction product to 6-150 parts by weight of its respective curing agent provides satisfactory results.

Base 11, body 12 and cap 16 are formed by matched metal or compression molding techniques wherein a high strength polyester premix is utilized in the manufacture of at least one of said members. Henceforth throughout the specification and claims "polyester" is used in a generic sense and is defined as a resin formed by the reaction between a dibasic acid and a dihydroxy alcohol, both organic, or by the polymerization of a hydroxy carboxylic acid; modification with multifunctional acids and/or alcohols and some unsaturated reactants permit crosslinking to thermosetting resins.

More specifically, a selected polyester resin utilized in the practice of the invention comprises the reaction product of at least one glycol selected from butylene glycol, diethylene glycol, dipropylene glycol, ethylene glycol, neophental glycol and propylene glycol with one or more acids or anhydrides selected from adipic acid, azelaic acid, fumaric acid, isophthalic acid, teraphthalic acid, maleic anhydride and phthalic anhydride, wherein at least fumaric acid or maleic anhydride is used. Suitable monomers include one or more selected from alphamethyl styrene, chlorostyrene, diallyl phthalate, methyl methacrylate, styrene and vinyl toluene. It is understood that each such polyester resin may be cured at room temperature or at elevated temperatures with suitable catalysts.

Two typical formulae, I-II, for polyester premixes utilized in the practice of the invention, wherein the constituents are given in parts by weight, comprise:

|  | I | II |
|---|---|---|
| Resin | 59.5 | 48.5 |
| Catalyst | .5 | .5 |
| Internal release agent | 1 | 1 |
| Color agent | 3 | 1 |
| Filler | 7 | 5 |
| Fibers | 29 | 44 |

It is understood that a selected resin in such premix formulae may range from 25%-70%, by weight, with the resin content in bowling pins 10, 38, 41, 52 and 64 desirably ranging from approximately 30%-60%, by weight.

One or more catalysts, which may comprise 0.2%-2.0%, by weight, of the resin only, may be selected from benzoyl peroxide, bis (4-t-butycyclohexyl) peroxydicarbonate, cyclohexane peroxide, cumene hydroperoxide, d-t-butyl peroxide, 1,1-di-t-butyl peroxide-3,3,5-timethylcyclohexane, methyl ethyl ketone peroxide, peresters, t-butyl hydroperoxide, and t-butyl perbenzoate.

Zinc stearate is commonly used as an internal release agent; another commercially-available release agent consists of organic esters of orthophosphoric acid. These release agents range from 0.5%-2.0%, by weight, in the preferred embodiments of premix. As is well known, the internal release agent migrates to the surface during the curing cycle and prevents the premix from bonding to the surface of the mold. Accordingly, removal of such internal release agent is required from each portion to which adhesive is to be applied.

Titanium dioxide or other commercially-available coloring agent is normally included in the premix formulation to provide a casting of desired pigmentation.

The fillers most widely used in the practice of the invention include asbestos, calcium carbonate, clays and talcs; said fillers control viscosity, specific gravity, flow, color, as well as cost. It is to be understood that although no fillers may be used in a specific formulation, one or more of said fillers may comprise up to 60%, by weight, in preferred formulations. Lightweight fillers consisting of hollow microspheres of expanded glass, phenolic and silica, or sawdust, wood chips and ground cork may be added to the premix to reduce the specific gravity of the premix.

The fibers, preferably glass, desirably range from ¼inch-1 inch in length and may comprise from 5%-60%, by weight, of a premix. Boron filaments, sisal, commercially-available polyester fibers, and commercially-available fibers consisting of a copolymer of vinyl chloride and acrylonitrile also provide satisfactory results.

To prepare the polyester premix, a selected polyester resin, in the desired amount, is placed in a mixer after which the catalyst is added and thoroughly mixed, followed by the addition and mixing, successively, of the internal release agent, color agent, and fillers. The fibers are then added and mixed only to the extent required to wet the same.

As heretofore mentioned, base 11, body 12 and cap 16 are generally formed by matched metal or compression molding techniques. The amount of premix for a specified member is first weighed and then placed in a mold heated to 150°-350° Fahrenheit. The mold is then closed, the ram or rams advanced, either individually, simultaneously, or sequentially, and the casting cured from 3-5 minutes, depending primarily upon the catalyst and resin selected. Thereafter the ram or rams are withdrawn, the mold opened, and the casting removed.

In accordance with ABC specifications, a nonwood (synthetic) bowling pin must comply with certain physical parameters such as weight, center of gravity, radius of gyration about a horizontal axis, coefficient of restitution, and desirably produce a sound substantially similar to that produced by a hard maple bowling pin. In general, a relationship exists between the specific gravity of the selected premix, the hardness of said premix, the wall thickness of the pin, and the coefficient of restitution exhibited by the completed pin.

In those embodiments of the invention wherein base 11, body 12 and cap 16 of bowling pin 10 are each made of the same polyester premix, the walls of the respective members range from 3/16 inch-¾ inch, dependent primarily upon the specific premix formulation. It is further understood that different polyester premix formulations may be utilized in each of the several separate members. Additionally, body 12 may be composed of a selected polyester premix whereas base 11 and/or cap 16 may be composed of a thermoplastic composition such as injection molded acrylic, acrylonitrile-butadiene-styrene, cellulosics, nylon, polyethylene, polystyrene, or another thermoset, such as epoxy premix.

One or more coatings 37 of paint or lacquer may be applied to pin 10 thus formed as by dipping, spraying or other conventional method.

There is shown in FIG. 4 of the drawings a bowling pin 38 constructed in accordance with the principles heretofore described wherein a filler 39 is introduced through hole 24 and completely fills cavities 17, 25 and 31 (see FIG. 1); plug 40 of nylon, polyester, polystyrene or the like is placed in hole 24 with the lower surface thereof lying in the plane of bottom 22 or slightly thereabove. Suitable fillers 39 comprise, in part, flexible polyurethane foam, foamed latex, foamed polyester, foamed rubber, and rigid polyurethane foam. Upon being struck by a bowling ball, pin 38 produces a sound similar to that produced by a conventional bowling pin of hard maple.

Figure 5:
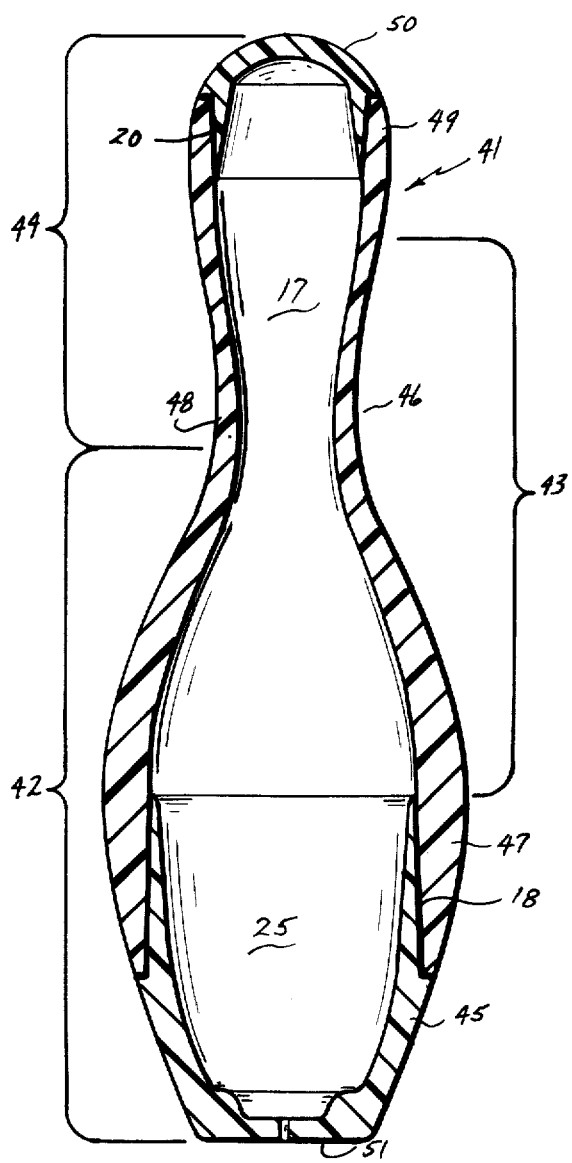
FIG. 5 is a vertical sectional view through another embodiment of hollow bowling pin.

Referring now to FIG. 5, bowling pin 41 comprises three horizontally extending and vertically overlapping sections 42–44 corresponding to different hardnesses of the respective sections, as indicated on the Shore D hardness scale. Pin 41, similar in construction to the embodiment of FIG. 1, comprises base 45, body 46 consisting of belly 47, neck 48 and head 49, and cap 50. In accordance with specifications of the ABC (see *ABC Bowling Equipment Specifications, Aug.* 1, 1971 *Edition*) a bowling pin must measure 15 inches ± 2/64 inch. Section 42, which ranges from 55–85 in Shore D hardness, extends from the bottom 51 of pin 41 to approximately 10 inches thereabove and includes base 45, belly 47 and the lower portion of neck 48. Section 43, ranging from 70–100 in Shore D hardness, extends from approximately 5 inches – 13 inches above bottom 51 and includes belly 47 and neck 48. Section 44, which ranges from 55–85 in Shore D hardness, extends from approximately 10 inches above bottom 51 to the top of pin 41, and includes the upper portion of neck 48, head 49 and cap 50. By providing a relatively soft composition in section 42, for example, a desirable coefficient of restitution is achieved; a relatively hard composition in section 43 provides strength in neck 48 and additionally provides advantageous sound characteristics; a relatively soft composition in section 44 also advantageously affects the sound characteristics.

Since at least two different polyester premixes having different ranges of hardness are utilized in body 46, a rough casting is desirably first made. More specifically, a female mold is used which generally conforms externally to that portion of body 46 intermediate the smallest diameter of neck 48 and the largest diameter of belly 47, respectively. A predetermined weight of a first polyester premix, which is to be used in section 44 and ranges from 55–85 Shore D hardness, is placed in said female mold and compacted; a predetermined weight of a second polyester premix, which is to be used in section 43 and ranges from 70–100 Shore D hardness, is then placed in said mold and compacted; finally, a predetermined weight of said first polyester premix, which is to be used in section 42, is placed in said mold and compacted; said rough casting may then be removed and placed in the medial portion of a female finishing mold which includes a first, axially extending, generally converging conical ram adapted to form conical section 20 and the upper portion of cavity 17; a second, coacting, axially extending, generally converging conical ram is adapted to form conical section 18 and the lower portion of cavity 17. The first ram is advanced into the neck of said finishing mold until the end thereof is approximately 1 inch from the surface of said first premix, after which said second ram is advanced into said mold to the limit of its travel whereby said premixes flow around said first and second rams forming sections 42–44; the fibers in said pemixes intermix between adjacent sections 42–44 of body 46 thus formed. Final pressure is then applied by means of said first ram after which body 46 is cured at 150°–350° Fahrenheit for 3–5 minutes.

Figure 6:
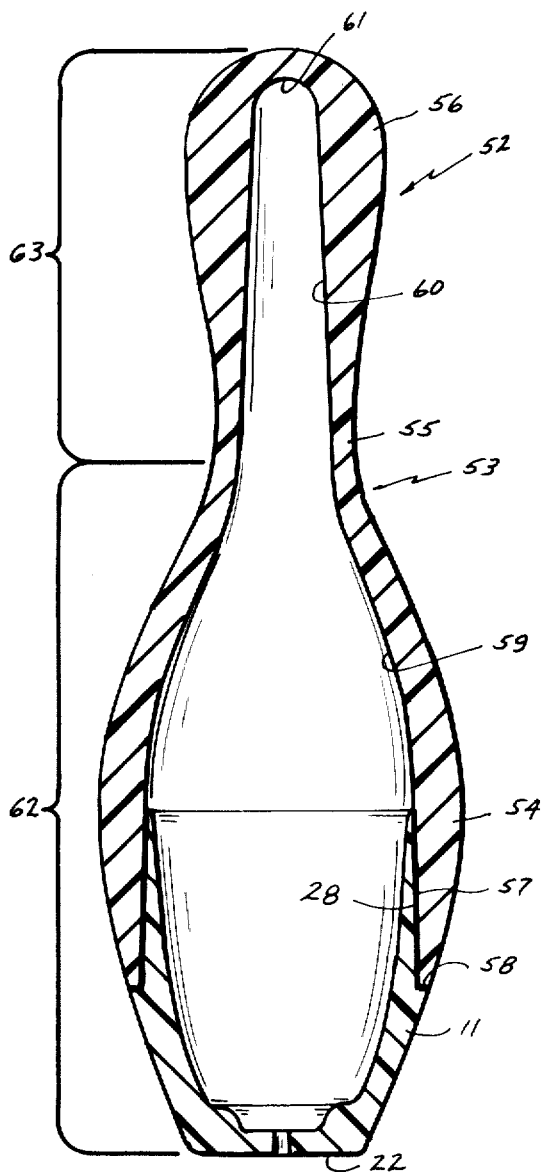
FIG. 6 is a vertical sectional view through still another embodiment of hollow bowling pin.

Referring now to FIG. 6 of the drawings, there is shown a hollow bowling pin 52 comprising base 11, heretofore mentioned, and hollow body 53 comprising belly 54, neck 55, and head 56 which portions are contoured in accordance with ABC specifications. Interiorly, diverging conical section 57, adapted to receive portion 28 of base 11, terminates downwardly in edge 58 and upwardly in communicating, converging conical section 59 which generally corresponds in shape to the exterior portions of belly 54 and neck 55, respectively; converging conical section 60 and rounded apex 61 terminate upwardly in head 56. Portion 28 of base 11 inserts and is fixedly secured in conical section 57 in body 53 in the manner heretofore described in connection with FIG. 1 of the drawings.

In such embodiment, two vertically extending sections 62–63 correspond respectively to the specific gravities of the polyester premixes utilized in said sections. A first polyester premix having a specific gravity of 1.6±0.2 is used in section 62, said section extends from bottom 22 of pin 52 to approximately 10 inches thereabove, and includes base 11, belly 54 and the lower portion of neck 55. A second polyester premix having a specific gravity of 1.0±0.2 is used in section 63, said section extends from approximately 10 inches above bottom 22 to the top of pin 52, and includes the upper portion of neck 55 and head 56. Furthermore, said first polyester premix may range from 55–85 Shore D hardness whereas said second polyester premix may range from 70–100 Shore D hardness.

In the manufacture of body 53 a rough casting is desirably first prepared. A predetermined weight of said second premix, to be used in section 63, is placed in a female mold which generally conforms to the shape of body 53 intermediate the smallest diameter of neck 55 and the greatest diameter of belly 54, respectively, and compacted. A predetermined weight of said first premix, to be used in section 62, is then placed in said mold and compacted. The rough casting is then placed in the medial portion of a female finishing mold which normally includes a longitudinally extending ram adapted to form conical sections 57, 59, 60 and apex 61. Upon insertion of said ram into said mold, not only do the premixes flow around said ram to form the respective portions of body 53 but also the fibers between the adjacent sections 62, 63 are intermixed. Body 53 is then cured in the manner heretofore described.

Figure 7:
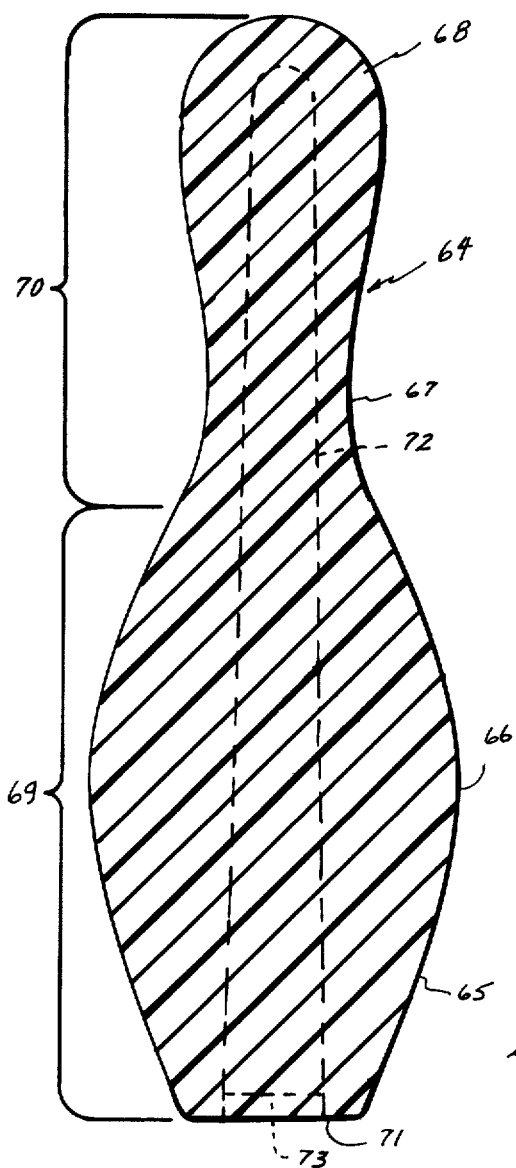
FIG. 7 is a vertical sectional view through a solid bowling pin of the subject invention.

There is shown in FIG. 7 a solid bowling pin 64 contoured in accordance with ABC specifications to define base 65, belly 66, neck 67 and head 68. In such embodiment, two vertically extending sections 69-70 correspond to the specific gravities of the polyester premixes utilized in said sections, respectively. A first polyester premix having a specific gravity of 0.65±0.15 is utilized in section 69, said section extends from bottom 71 to approximately 9 inches thereabove, and includes base 65, belly 66 and the lower portion of neck 67. A second polyester premix having a specific gravity of 0.72±0.15 is used in section 70, said section extends from approximately 9 inches above bottom 71 to the top of pin 64, and includes neck 67 and head 68.

In the manufacture of pin 64, predetermined weights of the polyester premixes utilized in sections 69, 70 are at least partially kneaded together prior to placement in the mold to insure a good bond. Pin 64 is then cured at 150°–200° Fahrenheit for 5–10 minutes.

In a modification of the embodiment of FIG. 7, an axially extending, converging conical cavity 72 opens downwardly in bottom 71 and terminates upwardly in head 68. Plug 73 is fixedly secured in cavity 72 with the lower surface thereof lying in the plane of bottom 71 or slightly thereabove.

Figure 8:
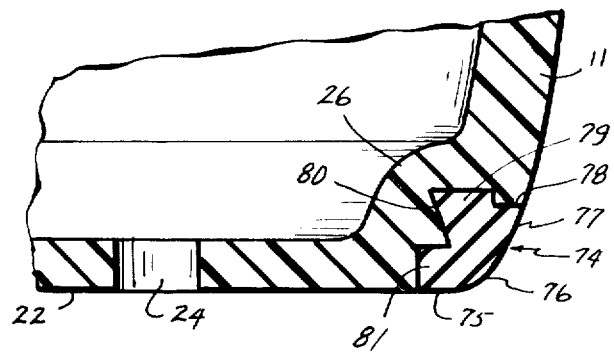
FIG. 8 is a fragmentary, greatly enlarged, vertical sectional view showing one embodiment of base attachment which may be utilized in each of the embodiments of the subject invention.

Referring now to FIG. 8 of the drawings, there is shown an annular attachment 74, preferably composed of nylon or the like, which may be utilized in each of the bowling pins heretofore described. Attachment 74 includes an essentially flat bottom 75, radiused edge 76, and diverging conical side wall 77 which terminates upwardly in shoulder 78. Concentric ring 79 of reduced external diameter terminates upwardly of shoulder 78; the innermost, undercut side 80 of ring 79 terminates downwardly of shoulder 78 in radially extending flange 81 of reduced height.

Figure 9:
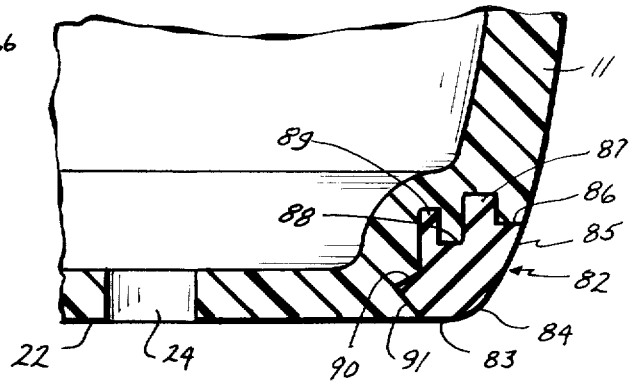
FIG. 9 is a fragmentary, greatly enlarged, vertical sectional view showing another embodiment of base attachment of the subject invention.

Attachment 82 of FIG. 9 comprises bottom 83, radiused edge 84, and diverging conical side wall 85 which terminates upwardly in shoulder 86. Concentric ring 87 of reduced external diameter terminates upwardly of shoulder 86; concentric groove 88, inwardly of ring 87, terminates downwardly of shoulder 86; concentric ring 89 of reduced external diameter and of lesser height than ring 87, terminates downwardly of shoulder 86 in converging conical section 90; diverging conical section 91 terminates downwardly in bottom 83.

Attachments 74, 82 heretofore described are heated to the premix mold cure temperature and positioned in the mold used for making base 11, for example, and a predetermined weight of a polyester premix then placed in said mold, the ram advanced after which base 11 is cured in the manner heretofore described whereby said attachment is molded into the lower portions of base 11.

The invention is not to be restricted solely to the specific configurations of attachments 74, 82 heretofore described but also includes a base attachment of any configuration which is molded into the basal portions of a bowling pin of thermosetting or thermoplastic composition.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. The method for forming a plastics body having a cavity therein comprising:
    predetermined quantities of at least first and second thermosetting molding materials are preliminary shaped in at least one mold to form at least one rough molding, said materials being adapted to form portions of the final product having different hardness characteristics,
    placing said at least one rough molding in a mold cavity of a finishing mold having a desired shape,
    thereafter inserting at least one mandrel into said mold cavity and into said at least first and second materials so as to at least partially mix adjacent portions of said materials, and
    curing said materials with heat thereby forming said body, and removing said at least one mandrel from said body and said body from said finishing mold.

2. The method of claim 1 including inserting said at least one mandrel axially into said mold cavity.

3. The method of claim 1 wherein the step of curing said body is at a temperature of 150°-350° Fahrenheit for 3-5 minutes.

4. The method of claim 1 wherein said first material is adapted to form a first body portion having a Shore D hardness in the range of 55-85, said second material is adapted to form a second body portion above said first body portion having a Shore D hardness in the range of 70-100, and a third body portion above said second body portion having a Shore D hardness in the range of 55-85.

5. The method of claim 1 including regulating travel of first and second mandrels into said mold cavity and into said materials to form an axial cavity in said body and to simultaneously mix adjacent portions of said materials.

6. The method of claim 5 including forming a transverse molded plastics web between said mandrels in said axial cavity.

7. The method for forming a plastics body having a cavity therein comprising:
    forming at least one rough molding in at least one mold from predetermined quantities of at least first and second thermosetting molding materials, said materials adapted to form portions of the final product having different hardness characteristics,
    placing said at least one rough molding in a mold cavity of a finishing mold having a desired shape,
    inserting at least one mandrel into said mold cavity and into said at least first and second materials to form an axial cavity in said body and to at least partially mix adjacent portions of said materials, and curing said materials with heat thereby forming said body, and removing said at least one mandrel from said body and said body from said finishing mold.

8. The method of claim 7 wherein said first material is adapted to form a first body portion having a Shore D hardness in the range of 55-85, said second material is adapted to form a second body portion above said first body portion having a Shore D hardness in the range of 70-100, and a third body portion above said second body portion having a Shore D hardness in the range of 55-85.

* * * * *